United States Patent
Kim et al.

(10) Patent No.: US 12,374,953 B2
(45) Date of Patent: Jul. 29, 2025

(54) ANTI-EROSION STRUCTURE OF MOTOR INCLUDING A GROUND STRUCTURE

(71) Applicant: HYUNDAI MOBIS CO., LTD., Seoul (KR)

(72) Inventors: Yong Ho Kim, Seoul (KR); Bit Na Lee, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 273 days.

(21) Appl. No.: 18/088,260

(22) Filed: Dec. 23, 2022

(65) Prior Publication Data
US 2023/0402897 A1 Dec. 14, 2023

(30) Foreign Application Priority Data

Jun. 14, 2022 (KR) .................. 10-2022-0072351
Jun. 14, 2022 (KR) .................. 10-2022-0072363

(51) Int. Cl.
| | |
|---|---|
| H02K 5/173 | (2006.01) |
| F16C 41/00 | (2006.01) |
| H01R 39/12 | (2006.01) |
| H01R 39/64 | (2006.01) |
| H02K 11/40 | (2016.01) |
| H02K 17/16 | (2006.01) |
| H05F 3/02 | (2006.01) |

(52) U.S. Cl.
CPC ......... *H02K 5/1732* (2013.01); *F16C 41/002* (2013.01); *H02K 11/40* (2016.01); *H02K 17/16* (2013.01); *H01R 39/12* (2013.01); *H01R 39/643* (2013.01); *H05F 3/02* (2013.01)

(58) Field of Classification Search
CPC ...... H02K 11/40; H01R 39/643; H01R 39/12; F16C 41/002
USPC .......................................................... 310/220
See application file for complete search history.

(56) References Cited

U.S. PATENT DOCUMENTS

| | | | |
|---|---|---|---|
| 2018/0083515 A1* | 3/2018 | Graves | H02K 9/193 |
| 2022/0209616 A1* | 6/2022 | Wang | H02K 5/1732 |
| 2022/0216772 A1* | 7/2022 | Wei | F16C 19/52 |
| 2022/0255407 A1* | 8/2022 | Chen | H02K 7/003 |
| 2022/0329127 A1* | 10/2022 | Hubert | H02K 5/1732 |
| 2022/0389971 A1* | 12/2022 | Barthelme | F16C 19/06 |

(Continued)

FOREIGN PATENT DOCUMENTS

| | | | | |
|---|---|---|---|---|
| CN | 113364222 A | * | 9/2021 | H02K 11/01 |
| JP | 2009243695 A | * | 10/2009 | F16C 19/52 |

(Continued)

OTHER PUBLICATIONS

Translation of WO 2019238358 A1 (Year: 2019).*

(Continued)

*Primary Examiner* — Tulsidas C Patel
*Assistant Examiner* — Daniel K Schlak
(74) *Attorney, Agent, or Firm* — NSIP Law (57) ABSTRACT

An anti-erosion structure of a motor includes a housing configured to accommodate a stator, a rotor disposed inside the stator, and a shaft disposed inside the rotor; a rear cover coupled to a rear side of the housing; and a ground structure configured to ground the shaft. The ground structure includes a ground bearing installed on the shaft, and a conductor bar having one side fixed to the rear cover and another side contacting the ground bearing.

17 Claims, 10 Drawing Sheets

(56) References Cited

U.S. PATENT DOCUMENTS

| | | | |
|---|---|---|---|
| 2023/0093962 A1* | 3/2023 | Danh | H02K 7/083 |
| | | | 310/90 |
| 2023/0216372 A1* | 7/2023 | Gao | H02K 5/1732 |
| | | | 310/91 |

FOREIGN PATENT DOCUMENTS

| | | | | |
|---|---|---|---|---|
| KR | 10-1442414 B1 | | 9/2014 | |
| WO | WO-2019238358 A1 * | 12/2019 | | H02K 11/40 |

OTHER PUBLICATIONS

Translation of CN 113364222 A (Year: 2021).*
Translation of WO 2019238358 A (Year: 2019).*
Translation of JP 2009243695 A (Year: 2009).*

* cited by examiner

Prior Art

ANTI-EROSION STRUCTURE OF MOTOR INCLUDING A GROUND STRUCTURE

CROSS-REFERENCE TO RELATED APPLICATIONS

This application claims the benefit under 35 U.S.C. § 119 to Korean Patent Application No. 10-2022-0072351, filed on Jun. 14, 2022, and Korean Patent Application No. 10-2022-0072363, field on Jun. 14, 2022, in the Korean Intellectual Property Office, the entire disclosures of which are incorporated herein by reference for all purposes.

TECHNICAL FIELD

The following disclosure relates to an anti-erosion structure of a motor, and more particularly, to an anti-erosion structure of a motor in which a ground bearing is installed on a shaft, a conductor bar is installed on a rear cover, and the conductor bar is in contact with the bearing to ground the shaft, thereby preventing an anti erosion phenomenon occurring on a fixed bearing side

BACKGROUND

Recently, pure electric powered eco-friendly vehicles such as electric vehicles or fuel cell vehicles are attracting attention. An electric motor (hereinafter referred to as "motor") is mounted in such an electric powered eco-friendly vehicle as a driving source that obtains a rotational force with electric energy instead of an internal combustion engine such as an existing engine.

A motor used as a power source of an eco-friendly vehicle includes a housing, a stator fixedly installed inside the housing, and a rotor that is disposed with a predetermined air gap from the stator and rotates around a shaft as a driving shaft. A motor used in an eco-friendly vehicle receives three-phase AC power through an inverter. The inverter converts DC power of a battery into three-phase AC through power module switching. In this case, a 3-phase voltage is not in the form of a perfect sine wave, but in the form of a square wave, and the sum of the three-phase voltages is not zero. This is called a common mode voltage. Due to the common mode voltage applied to a coil of the motor, an axial voltage is generated on the shaft due to the effect of a parasitic capacitance inside the motor. The axial voltage causes a potential difference between inner and outer rings of a drive bearing that supports the shaft, and causes erosion of the drive bearing by a discharge mechanism inside the drive bearing. The erosion seriously affects the durability of the motor such as damaging the drive bearing.

Figure 1:
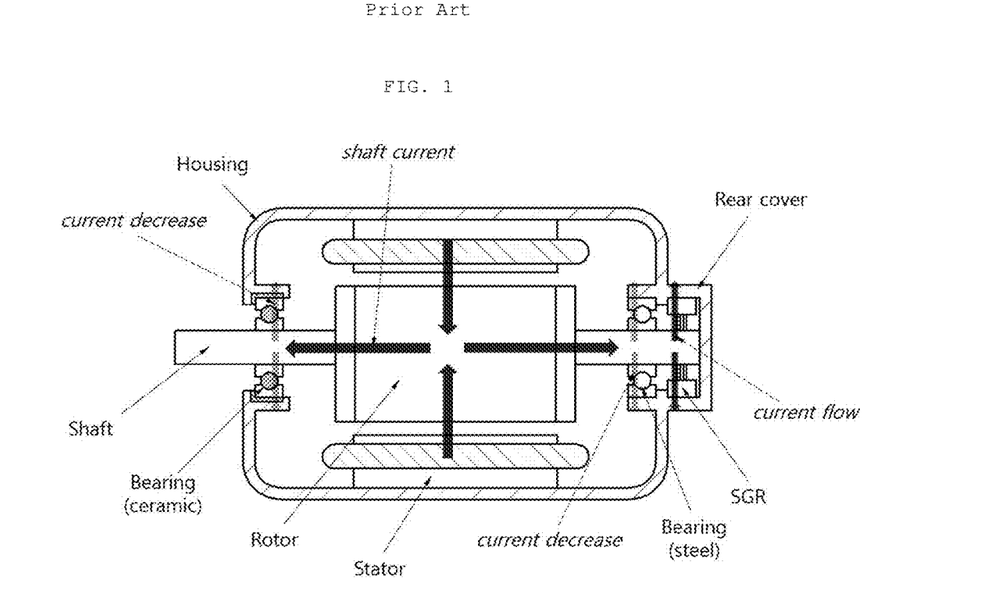
FIG. 1 is a diagram illustrating the related art.

FIG. 1 is a diagram illustrating the related art. In the related art, in order to reduce the axial voltage caused by the shaft of the motor, a shaft ground ring (SGR) that conducts the housing and shaft is installed between the shaft and the housing, and simultaneously or separately, the drive bearing on the opposite side of the shaft ground ring is formed of a ceramic ball bearing having insulation rather than a steel ball bearing. Since the ground ring needs to electrically connect the rotating shaft and the fixed housing to a ground, friction is generated between the shaft ground ring and the shaft, and the durability of the shaft ground ring is inevitably deteriorated due to the generated friction. In addition, when the cooling oil inside the motor flows into the shaft ground ring, the phenomenon in which a brush applied to the shaft ground ring is smeared with cooling oil and coated occurs, resulting in an increase in resistance on the shaft ground ring side. As the amount of current flowing through the shaft ground ring is reduced, the grounding performance of the shaft ground ring is greatly reduced. Furthermore, the shaft ground ring and the ceramic ball bearing have the disadvantage of being expensive.

RELATED ART DOCUMENT

Patent Document (Patent Document 1) Korea Patent Publication No. 10-1442414 (registered on Sep. 12, 2014)

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an anti-erosion structure of a motor includes a housing configured to accommodate a stator, a rotor disposed inside the stator, and a shaft disposed inside the rotor; a rear cover coupled to a rear side of the housing; and a ground structure configured to ground the shaft. The ground structure includes a ground bearing installed on the shaft, and a conductor bar having one side fixed to the rear cover and another side contacting the ground bearing.

The ground bearing may be configured to be inserted into a hollow space of the shaft, and press-fitted into the hollow space of the shaft to have an outer ring of the ground bearing closely adhere to an inner circumferential surface of the shaft. The conductor bar may be in contact with an inner ring of the ground bearing.

The conductor bar may include a fixed part fixed to the rear cover and a protrusion extending from the fixed part and protruding toward the shaft. At least a portion of the protrusion may be inserted into a hollow space of the ground bearing to contact an outer circumferential surface of the inner ring of the ground bearing.

The protrusion of the conductor bar may be configured to be press-fitted into the hollow space of the ground bearing to press the inner ring of the ground bearing radially outward.

The conductor bar may be U-shaped, and have a central portion formed in a ring shape to be in contact with the inner ring of the ground bearing. End portions of the conductor bar may be fixed to the rear cover.

A portion of the protrusion of the conductor bar insertable into the hollow space of the ground bearing may be a head part, and a remaining portion of the protrusion may be a body part. The head part may have a ring shape, and the body part may be narrowly formed.

A spherical structure may protrude from the conductor bar.

A portion of the protrusion of the conductor bar insertable into the hollow space of the ground bearing may be a head part, and a remaining portion of the protrusion may be a body part. The head part may have a spherical shape, and the body part may be narrowly formed.

A guide groove recessed inward by a predetermined amount may be formed on the outer circumferential surface of the inner ring of the ground bearing so that a portion of the protrusion of the conductor bar contacting the inner ring of the ground bearing is seated.

The ground bearing may be installed outside the shaft. The shaft may be configured to be press-fitted into the hollow space of the ground bearing so that the inner ring of the ground bearing closely adheres to an outer circumferential surface of the shaft. The conductor bar may be in contact with an outer ring of the ground bearing.

The conductor bar may include a fixed part fixed to the rear cover and an extension part extending from the fixed part toward the shaft. An end portion of the extension part in the extending direction may extend outward in a radial direction of the outer ring of the ground bearing and may be in contact with an outer circumferential surface of the outer ring of the ground bearing.

The extension part of the conductor bar may press the outer ring of the ground bearing radially inward.

The conductor bar may be a rod member. A central portion of the conductor bar may be bent radially inward. An end portion of a shaft side of the conductor bar may be in contact with the outer ring of the ground bearing, and an end portion of a rear cover side of the conductor bar may be fixed to the rear cover.

The end portion of the shaft side of the conductor bar may be formed straight.

A guide groove recessed inward by a predetermined amount may be formed on the outer circumferential surface of the outer ring of the ground bearing so that a portion of the extension part of the conductor bar contacting the outer ring of the ground bearing is seated.

The conductor bar may be bolted to the rear cover.

An inside space of the ground bearing may be filled with conductive grease.

The housing may be further configured to accommodate a drive bearing installed on the shaft and support the shaft, and a bearing ball of the drive bearing may be formed of a steel ball.

In another general aspect, an anti-erosion structure of a motor includes a housing configured to accommodate a stator, a rotor disposed inside the stator, and a shaft disposed inside the rotor; a rear cover coupled to a rear side of the housing; and a ground structure configured to ground the shaft. The ground structure includes a ground bearing inserted into a hollow space of the shaft, and a conductor bar having one side fixed to the rear cover and another side contacting the ground bearing.

In another general aspect, an anti-erosion structure of a motor includes a housing configured to accommodate a stator, a rotor disposed inside the stator, and a shaft disposed inside the rotor; a rear cover coupled to a rear side of the housing; and a ground structure configured to ground the shaft. The ground structure includes a ground bearing installed outside the shaft, and a conductor bar having one side fixed to the rear cover and another side contacting the bearing.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION OF MAIN ELEMENTS

1: Motor
10: Housing
11: Shaft
11C: Hollow of shaft
12: Drive bearing
20: Rear cover
30: Ground structure
100: Ground bearing
100C: Housing of ground bearing
110: Inner ring
120: Outer ring
130: Bearing ball
200: Conductor bar
210: Fixed part of conductor bar
220: Protrusion of conductor bar, extension of conductor bar
300: Fixing member

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

This disclosure is directed to providing an anti-erosion structure of a motor that may stably secure grounding performance of a shaft, and may be easily and inexpensively manufactured by having a simple structure.

First Embodiment

Figure 2:
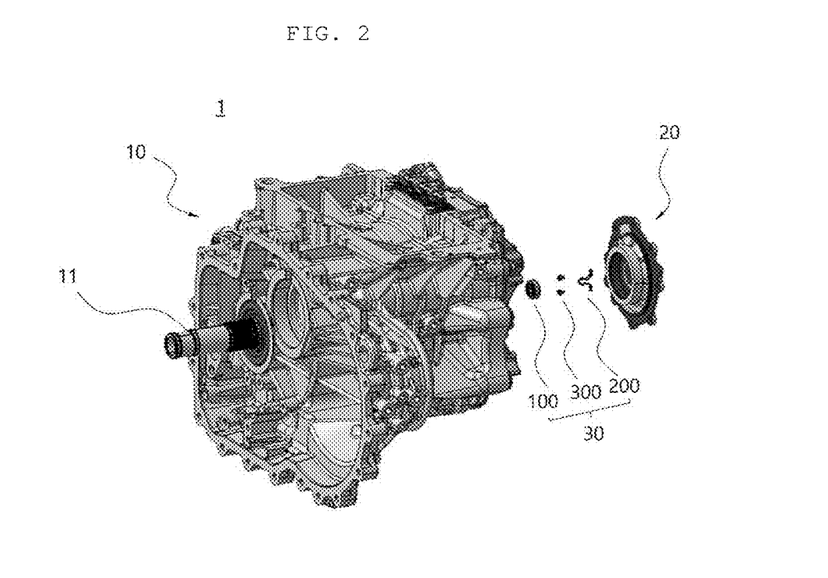
FIG. 2 is an exploded perspective view of a motor according to an embodiment of the present disclosure.
Figure 3:
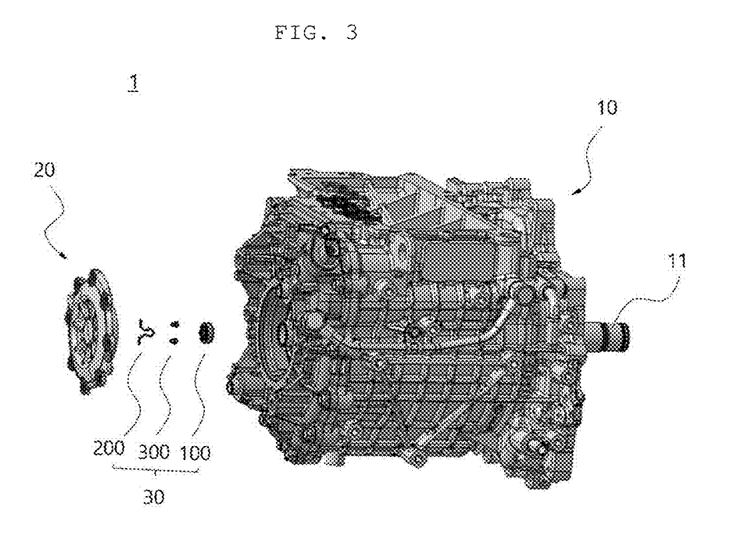
FIG. 3 is a view of FIG. 2 viewed from an opposite direction.

FIG. 2 is an exploded perspective view of a motor according to an example of the present disclosure, and FIG. 3 is a view of FIG. 2 viewed from an opposite direction. As illustrated, a motor 1 of the present disclosure largely includes a housing 10, a rear cover 20, and a ground structure 30.

The housing 10 is a cover member accommodating various components of a motor therein, and may accommodate a stator, a rotor, a shaft 11, a drive bearing 12, and the like. The stator may be disposed on the outermost side of the housing, the rotor may be disposed inside the stator, the shaft 11 may be disposed inside the rotor, and the drive bearing 12 may be disposed on the shaft to support the shaft (see FIGS. 1 and 4). The shaft 11 may be a hollow shaft or a solid shaft, and in the case of the solid shaft, a groove may be formed in a center of the shaft, and accordingly, a hollow 11C may be formed in the center of the shaft 11 along an axial direction.

The rear cover 20 is a cover member coupled to a rear of the housing 10 to close the opened rear of the housing 10. The rear cover 20 is made of a metal material and may be grounded.

The ground structure 30 is a configuration for grounding the shaft 11. The present disclosure relates to an anti-erosion structure of a motor, and by grounding the shaft 11 through the ground structure 30, it is possible to prevent the drive bearing from being eroded by an axial current flowing through the shaft 11.

Referring back to FIGS. 2 and 3, the ground structure 30 of the present disclosure includes a ground bearing 100 and a conductor bar 200, and further includes a fixing member 300.

The ground bearing 100 includes an inner ring, an outer ring, and a bearing ball interposed between the inner ring and the outer ring, and an inside of the ground bearing 100 may be filled with grease. The conductor bar 200 is a conductive member and may be made of, for example, a metal material. The fixing member 300 is a member for fixing the conductor bar 200, and may be, for example, a bolt.

In the ground structure 30 of the present disclosure, the ground bearing 100 is inserted into a hollow 11C of the shaft at a rear end portion side of the shaft 11, and the conductor bar 200 has a structure in which one side is fixed to the rear cover 20 and the other side is in contact with the ground bearing 100. That is, the ground bearing 100 and the rear cover 20 are electrically connected through the conductor bar 200, and the ground bearing 100 is electrically connected to the shaft 11, and accordingly, the shaft 11 and the rear cover 20 are conducted with each other, and finally, the shaft 11 electrically connected to the rear cover 20 is grounded by the grounded rear cover 20.

In this way, as the shaft 11 and the rear cover 20 are electrically connected through the ground structure 30, a new path through which the axial current on the shaft is transmitted to the housing (including the rear cover) is generated, which forms a parallel structure with the existing current path passing through the drive bearing. Accordingly, the axial current of the shaft is distributed and transmitted to the rear cover 20 through the ground structure 30, and the amount of current passing through the drive bearing is reduced, thereby preventing the erosion in the drive bearing.

That is, according to the present disclosure, it is possible to prevent a drive bearing from being eroded to reduce, a loss of the drive bearing due to the erosion, reduce vibration and noise generated from a drive bearing due to the erosion phenomenon, and furthermore, reduce manufacturing cost of a motor by applying a steel ball instead of applying a ceramic ball to prevent the erosion in the related art.

Hereinafter, the ground structure 30 of the present disclosure will be described in more detail through specific embodiments.

Figure 4:
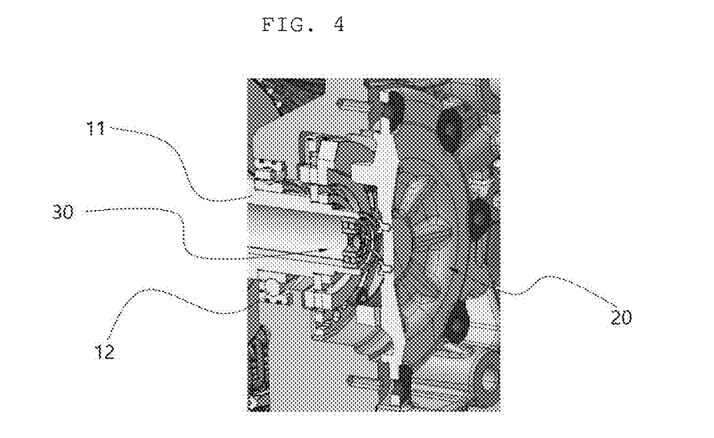
FIG. 4 is a cross-sectional perspective view of a housing and a rear cover before assembly.
Figure 5:
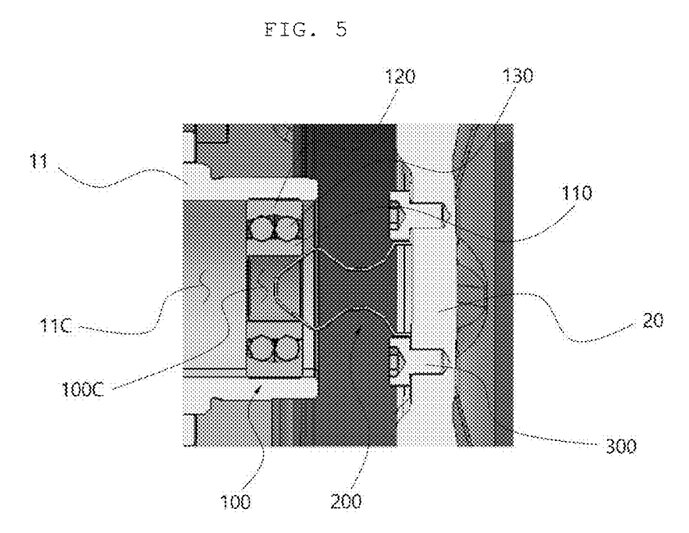
FIG. 5 is a view of FIG. 4 viewed from the side.
Figure 6:
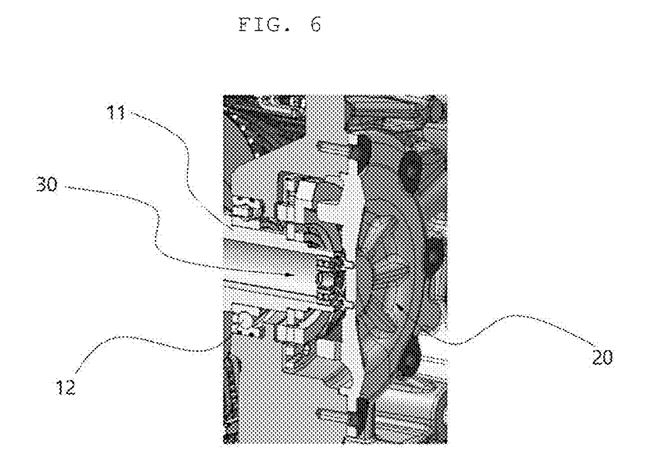
FIG. 6 is a cross-sectional perspective view of the housing and the rear cover after assembly.
Figure 7:
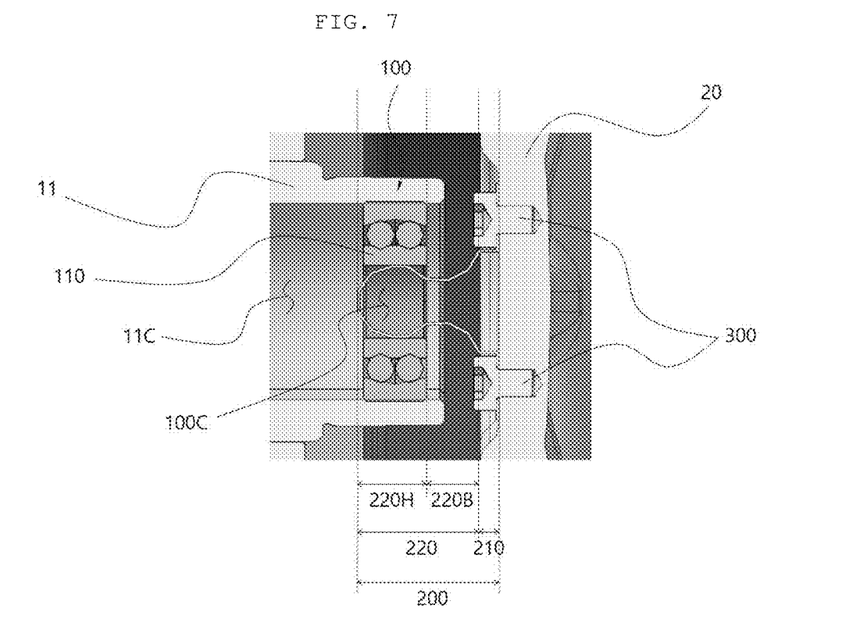
FIG. 7 is a view of FIG. 6 viewed from the side.
Figure 8:
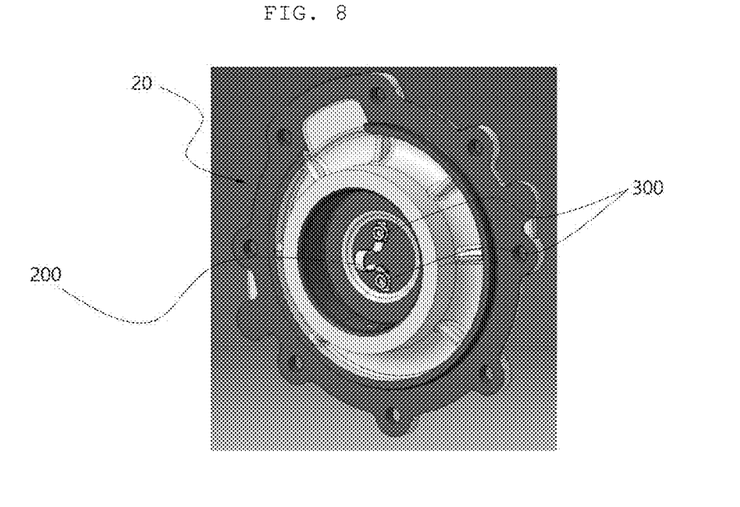
FIG. 8 is a view illustrating that a conductor bar is installed inside the rear cover.

FIG. 4 is a cross-sectional perspective view of the housing and the rear cover before assembly, FIG. 5 is a view of FIG. 4 viewed from the side, FIG. 6 is a cross-sectional perspective view of the housing and the rear cover after assembly, and FIG. 7 is a view of FIG. 6 viewed from the side, and FIG. 8 is a view illustrating that the conductor bar is installed inside the rear cover.

First, the ground bearing 100 is press-fitted into the hollow 11C of the shaft 11 so that the outer ring 120 of the ground bearing closely adheres to an inner circumferential surface of the shaft 11. For example, a diameter of the ground bearing 100 is greater than or equal to that of the hollow 11C of the shaft, so the ground bearing 100 may be intermediately fitted or interference-fitted to the hollow 11C of the shaft. Accordingly, the shaft and the ground bearing closely adhere to each other, and connectivity between the shaft and the ground bearing may be secured.

The conductor bar 200 is in contact with the inner ring 110 of the ground bearing. In this case, the conductor bar 200 has a structure that presses the inner ring 110 of the ground bearing radially outward, thereby increasing the amount of load of the inner ring 110 of the ground bearing. As a result, the bearing ball 130 and the inner and outer rings 110 and 120 more tightly adhere to each other, so constant connectivity may be secured.

More specifically, referring to FIG. 7, the conductor bar 200 includes a fixed part 210 fixed to the rear cover 20 and a protrusion 220 extending from the fixed part 210 and protruding toward the shaft 11, and at least a portion of the protrusion 220 is inserted into the hollow 11C of the ground bearing to be in contact with the outer circumferential surface of the inner ring 110 of the ground bearing. In this case, the protrusion 220 of the brush is press-fitted into a hollow 100C of the ground bearing. That is, a maximum diameter of the protrusion 220 of the conductor bar is formed larger than the diameter of the hollow 100C of the ground bearing, so the protrusion 220 of the conductor bar is press-fitted into the hollow 100C of the bearing. As a result, the inner ring 110 of the ground bearing may be pressed radially outward.

As a specific embodiment of the conductor bar performing this function, referring to FIGS. 5 to 8, the conductor bar 200 of this example is a bar member bent in a U shape, and a central portion thereof is formed in a ring shape to be in contact with the inner ring 110 of the ground bearing, and both end portions thereof are fixed to the rear cover 20, respectively.

In this case, when a portion of the protrusion 200 of the conductor bar inserted into the hollow of the ground bearing is referred to as a head part 220H, and the remaining part other than the head part 220H is referred to as a body part 220B, as illustrated, the head part 220H is formed of a ring shape, and the body part 220B is formed narrowly. Here, the conductor bar 200 of this example may have a predetermined elasticity, and the body part 220B is formed narrowly, and thus, has a structure in which the head part 220H is expanded, thereby increasing a pressing force against the inner ring 110. In addition, the structure of the conductor bar 200 is very simple, and there is an advantage in that manufacturing and installation are convenient.

Figure 9:
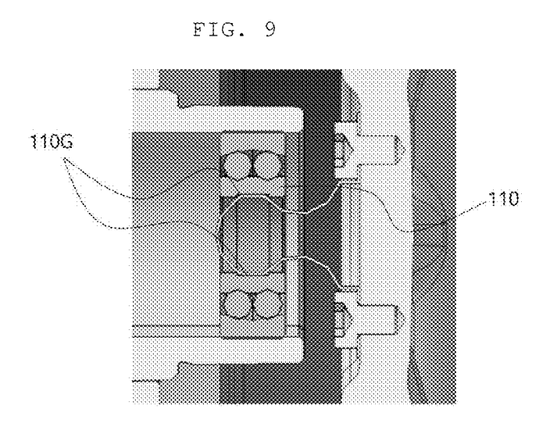
FIG. 9 is a view for explaining a guide groove of a ground bearing.

FIG. 9 is a view for explaining a guide groove of the ground bearing. As illustrated, a guide groove 110G recessed inward by a predetermined amount may be formed on the outer circumferential surface of the inner ring 110 of the ground bearing, and a portion of the protrusion 220 of the conductor bar contacting the inner ring 110 of the ground bearing may be seated and fixed in the guide groove 110G, thereby preventing the conductor bar 200 from slipping on the inner ring 110. The guide groove 110G may have a structure in which it is recessed by a predetermined amount in the axial direction at a specific position (e.g., a position corresponding to a conductor bar) on the outer circumferential surface of the inner ring 110, or may have a ring groove form in which it is recessed radially by a predetermined amount on the outer circumferential surface of the inner ring 110. In addition, a portion of the protrusion 220 of the conductor bar contacting the inner ring 110 has a flat structure so as to closely adhere to the outer circumferential surface of the inner ring 110, so a contact area with the inner ring increases to improve the connectivity between the inner ring and the conductor bar, and at the same time, is firmly seated in the guide groove, so the fixing force between the bearing and the conductor bar and the pressing force of the conductor bar toward the bearing may increase.

Figure 10:
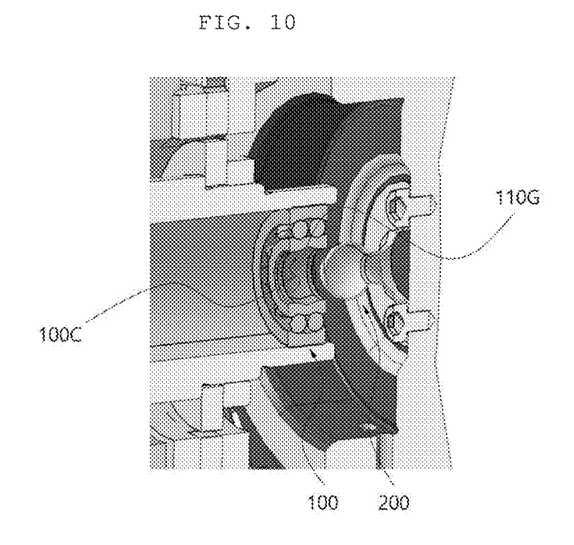
FIG. 10 is a cross-sectional perspective view of the housing and the rear cover before assembly.
Figure 11:
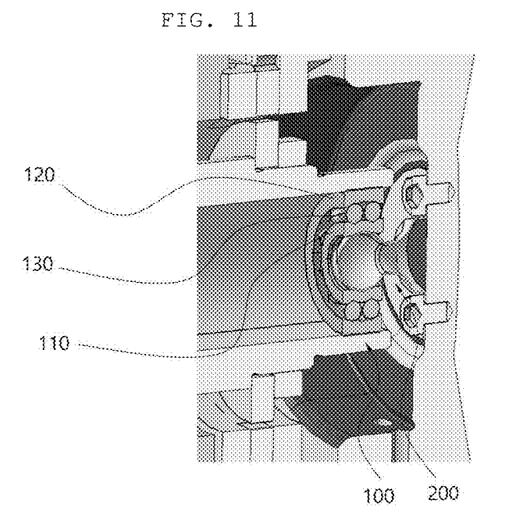
FIG. 11 is a cross-sectional perspective view of the housing and the rear cover after assembly.
Figure 12:
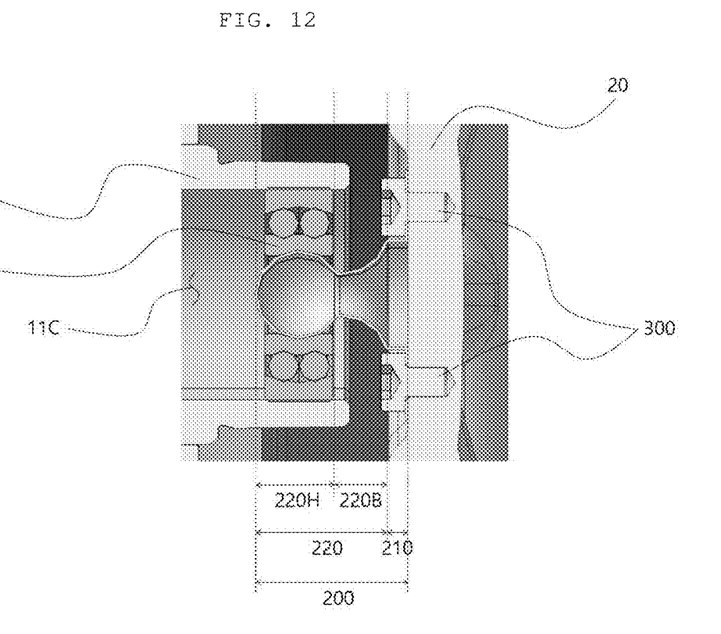
FIG. 12 is a view of FIG. 11 viewed from the side.

FIGS. 10 to 12 are views illustrating another embodiment of a conductor bar, FIG. 10 is a cross-sectional perspective view of the housing and the rear cover before assembly, FIG. 11 is a cross-sectional perspective view of the housing and the rear cover after assembly, and FIG. 12 is a view of FIG. 11 viewed from the side.

As illustrated, the conductor bar 200 of this example has a structure in which a spherical structure protrudes. More specifically, when a portion of the protrusion 200 of the conductor bar inserted into the hollow 100C of the ground bearing 100 is referred to as the head part 220H, and the remaining part other than the head part 220H is referred to as the body part 220B, the head part 220H has a spherical shape, and the body part 220B is formed narrowly. The cross-sectional shape of the side of the conductor bar 200 of this example is substantially the same as the cross-sectional shape of the side of the conductor bar 200 of the previous example, and the working principle thereof may also be the same. However, as the conductor bar 200 of this example has the spherical shape and the contact area with the inner ring 110 of the ground bearing increases, the pressing force against the inner ring further increases compared to the conductor bar 200 of the previous example, so there is an advantage in that the constant connectivity between the conductor bar 200 and the bearing 100 is improved.

In addition, as illustrated in FIG. 10, a guide groove 110G recessed inward by a predetermined amount is formed on the outer circumferential surface of the inner ring 110 of the ground bearing of this example, so the protrusion 220 of the conductor bar may be seated in the guide groove 110G. This performs the same function as the guide groove described in FIG. 9. In this case, the shape of the guide groove 110G of this example may be formed to correspond to the shape of a portion of the protrusion 220 of the conductor bar contacting the inner ring 110.

Meanwhile, as described above, the ground structure 30 of the present disclosure includes the fixing member 300, and the conductor bar 200 may be fixed to the rear cover 20 by the fixing member 300. In this case, the fixing member 300 may be a bolt. Referring back to FIGS. 7 and 12, and the like, the conductor bar 200 may be bolted to the rear cover 20. More specifically, as the fixed part 210 corresponding to the end portion of the conductor bar 200 on the rear cover 20 side is bolted to the rear cover 20 by the bolt 300, the conductor bar 200 may be installed and fixed to the rear cover 20. In this way, by the bolting coupling, the conductor bar may be easily and simply fixed to the rear cover, and at the same time, the electrical connection between the conductor bar and the rear cover may be secured, and furthermore, there is an advantage that the conductor bar may be installed on the rear cover of the existing motor as it is without changing the design of the rear cover.

As described above, the inside of the ground bearing 100 may be filled with grease for lubrication between the bearing ball 130 and the inner and outer rings 110 and 120. In this case, the grease may be conductive grease having conductivity, which may improve electrical connectivity between the bearing ball and the inner and outer rings.

Furthermore, as described above, the drive bearing 12 supporting the shaft 11 is installed on the shaft 11. In this case, in the motor 1 of the present disclosure, as the axial current flows through the ground structure 30 to reduce the amount of current flowing to the drive bearing side and reduce the erosion phenomenon on the drive bearing side, even if the bearing ball of the drive bearing is formed of a steel ball, damage to the drive bearing due to the erosion does not occur. That is, the bearing ball of the drive bearing of the motor of the present disclosure may be formed of the steel ball, and thus, may be cheaper than the ceramic ball bearing, thereby reducing the overall manufacturing cost of the motor.

Second Embodiment

Figure 13:
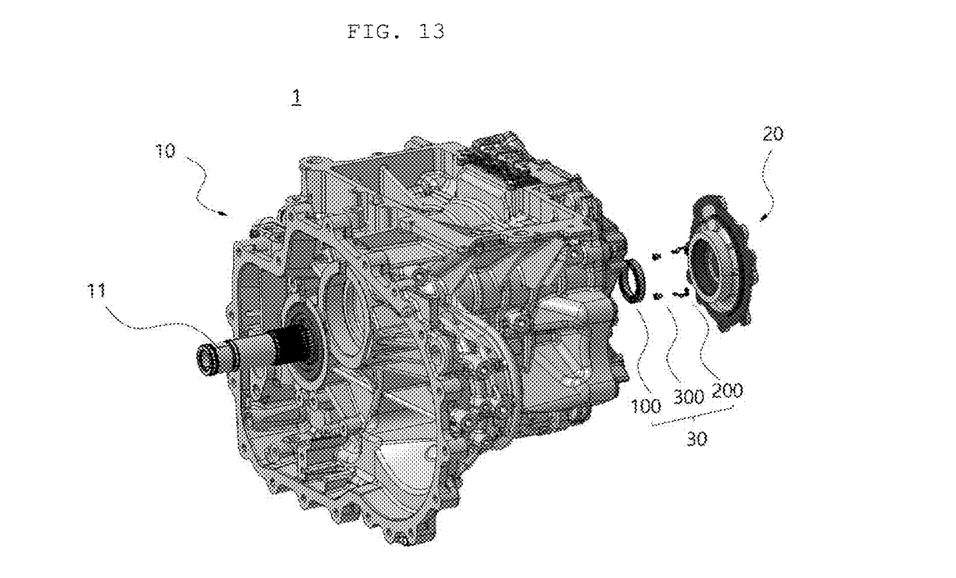
FIG. 13 is an exploded perspective view of a motor according to another example of the present disclosure.
Figure 14:
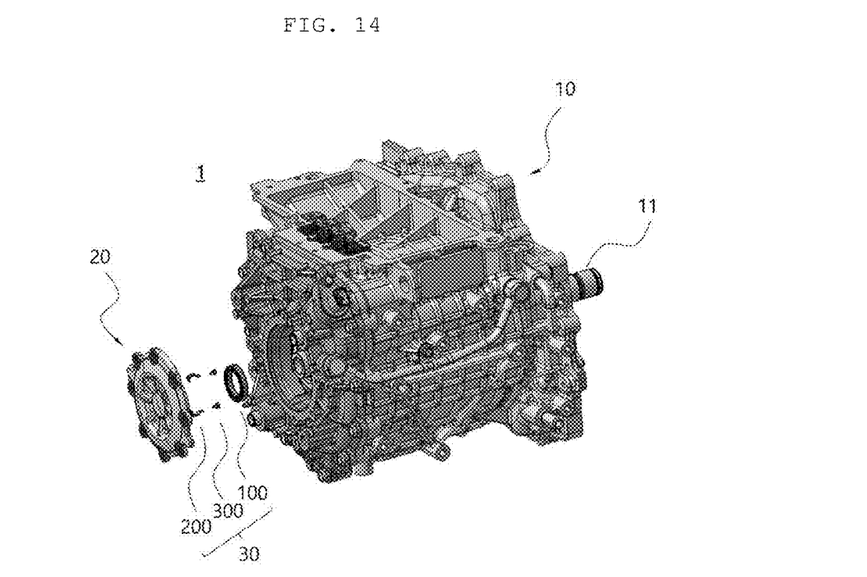
FIG. 14 is a view of FIG. 2 viewed from an opposite direction.

FIG. 13 is an exploded perspective view of a motor according to an example of the present disclosure, and FIG. 14 is a view of FIG. 13 viewed from an opposite direction. As illustrated, a motor 1 of the present disclosure largely includes a housing 10, a rear cover 20, and a ground structure 30.

The housing 10 is a cover member accommodating various components of a motor therein, and may accommodate a stator, a rotor, a shaft 11, a drive bearing 12, and the like. The stator may be disposed on the outermost side of the housing, the rotor may be disposed inside the stator, the shaft 11 may be disposed inside the rotor, and the drive bearing 12 may be disposed on the shaft to support the shaft (see FIGS. 1 and 15). The shaft 11 may be a hollow shaft or a solid shaft, and in the case of the solid shaft, a groove may be formed in a center of the shaft, and accordingly, a hollow 11C may be formed in the center of the shaft 11 along an axial direction.

The rear cover 20 is a cover member coupled to a rear of the housing 10 to close the opened rear of the housing 10. The rear cover 20 is made of a metal material and may be grounded.

The ground structure 30 is a configuration for grounding the shaft 11. The present disclosure relates to an anti-erosion structure of a motor, and by grounding the shaft 11 through the ground structure 30, it is possible to prevent the drive bearing from being eroded by an axial current flowing through the shaft 11.

Referring back to FIGS. 13 and 14, the ground structure 30 of the present disclosure includes a ground bearing 100 and a conductor bar 200, and further includes a fixing member 300.

The ground bearing 100 includes an inner ring, an outer ring, and a bearing ball interposed between the inner ring and the outer ring, and an inside of the ground bearing 100 may be filled with grease. The conductor bar 200 is a conductive member and may be made of, for example, a metal material. The fixing member 300 is a member for fixing the conductor bar 200, and may be, for example, a bolt.

In the ground structure 30 of the present disclosure, the ground bearing 100 is installed outside the shaft 11 at a rear end portion side of the shaft 11, and the conductor bar 200 has a structure in which one side is fixed to the rear cover 20 and the other side is in contact with the ground bearing 100. That is, the ground bearing 100 and the rear cover 20 are electrically connected through the conductor bar 200, and the ground bearing 100 is electrically connected to the shaft 11, and accordingly, the shaft 11 and the rear cover 20 are conducted with each other, and finally, the shaft 11 electrically connected to the rear cover 20 is grounded by the grounded rear cover 20.

In this way, as the shaft 11 and the rear cover 20 are electrically connected through the ground structure 30, a new path through which the axial current on the shaft is transmitted to the housing (including the rear cover) is generated, which forms a parallel structure with the existing current path passing through the drive bearing. Accordingly, the axial current of the shaft is distributed and transmitted to the rear cover 20 through the ground structure 30, and the amount of current passing through the drive bearing is reduced, thereby preventing the erosion in the drive bearing.

That is, according to the present disclosure, it is possible to prevent a drive bearing from being eroded to reduce, a loss of the drive bearing due to the erosion, reduce vibration and noise generated from a drive bearing due to the erosion phenomenon, and furthermore, reduce manufacturing cost of a motor by applying a steel ball instead of applying a ceramic ball to prevent the erosion in the related art.

Hereinafter, the ground structure 30 of the present disclosure will be described in more detail through specific embodiments.

Figure 15:
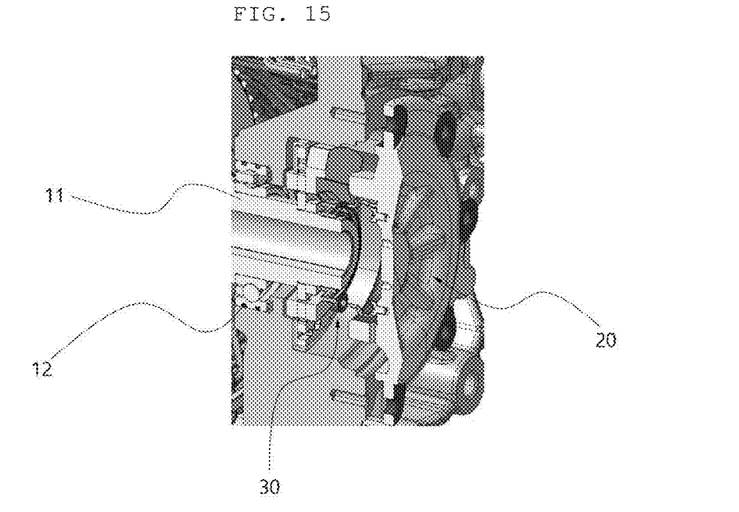
FIG. 15 is a cross-sectional perspective view of a housing and a rear cover that are not assembled.
Figure 16:
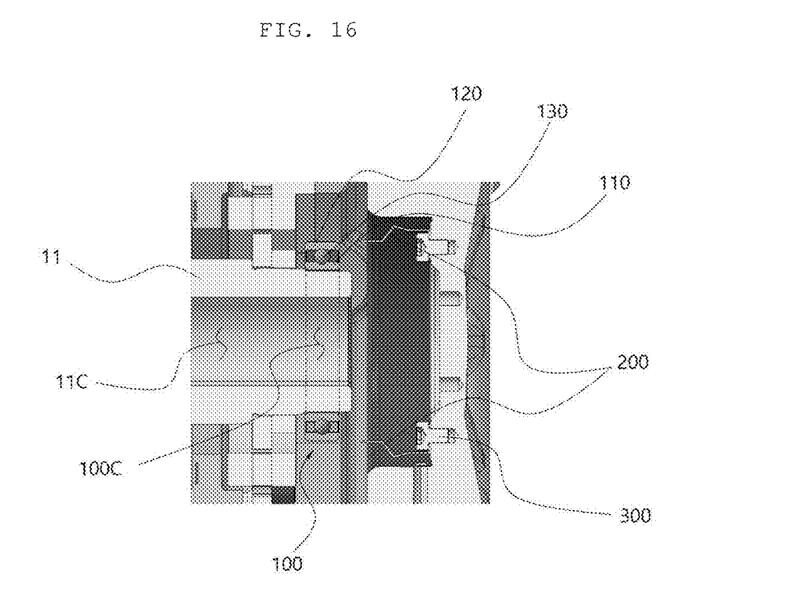
FIG. 16 is a diagram of FIG. 15 viewed from the side.
Figure 17:
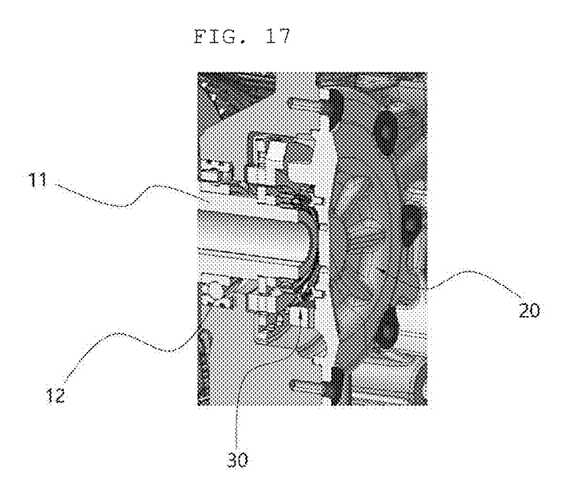
FIG. 17 is a cross-sectional perspective view of the housing and the rear cover after assembly.
Figure 18:
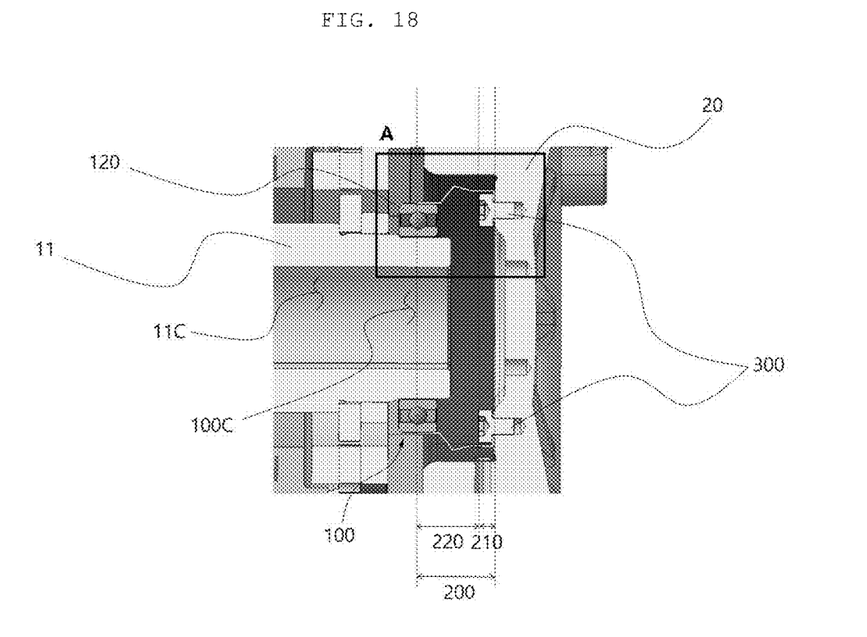
FIG. 18 is a view of FIG. 17 viewed from the side.
Figure 19:
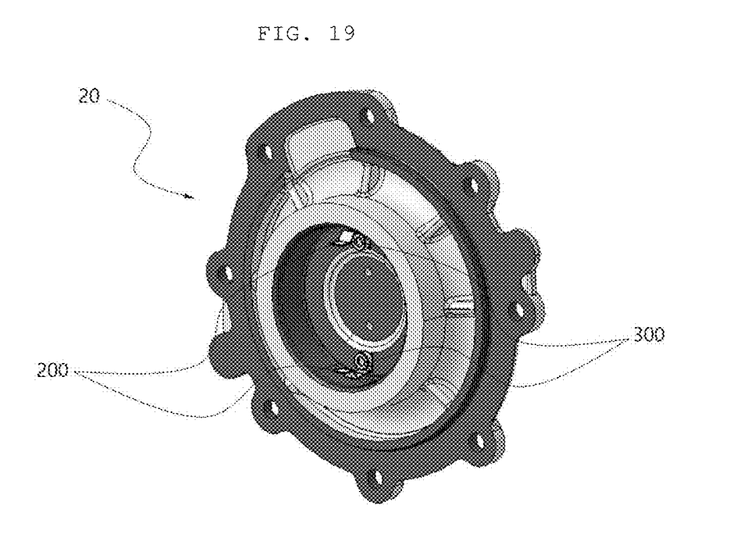
FIG. 19 is a view illustrating that a conductor bar is installed inside the rear cover.

FIG. 15 is a cross-sectional perspective view of the housing and the rear cover before assembly, FIG. 16 is a view of FIG. 15 viewed from the side, FIG. 17 is a cross-sectional perspective view of the housing and the rear cover after assembly, and FIG. 18 is a view of FIG. 17 viewed from the side, and FIG. 19 is a view illustrating that the conductor bar is installed inside the rear cover.

First, the ground bearing 100 is press-fitted into the hollow 11C of the shaft 100 so that the inner ring 110 of the ground bearing closely adheres to an outer circumferential surface of the shaft 11. For example, a diameter of the hollow 100C of the ground bearing 100 is greater than or equal to that of the hollow 11C of the shaft 11, so the hollow 100C of the ground bearing 100 may be intermediately fitted or interference-fitted to the hollow 11C of the shaft 11. Accordingly, the shaft and the ground bearing closely adhere to each other, and connectivity between the shaft and the ground bearing may be secured.

The conductor bar 200 is in contact with an outer ring 120 of the ground bearing. In this case, the conductor bar 200 has a structure that presses the outer ring 120 of the ground bearing radially inward, thereby increasing the amount of load of the outer ring 120 of the ground bearing. As a result, the bearing ball 130 and the inner and outer rings 110 and 120 more tightly adhere to each other, so constant connectivity may be secured.

More specifically, referring to FIG. 18, the conductor bar 200 includes a fixed part 210 fixed to the rear cover 20 and an extension 220 extending from the fixed part 210 toward the shaft 11, and an end portion of the extension portion 220 extends outward in the radial direction of the outer ring 120 of the ground bearing and is in contact with the outer circumferential surface of the outer ring 120 of the ground bearing. In this case, a central portion of the extension 220 of the conductor bar is bent radially inward to press the outer ring 120 of the ground bearing radially inward.

As a specific example of a conductor bar that performs this function, as illustrated, the conductor bar 200 is a rod member, and has a structure in which a central portion of the conductor bar 200 is bent radially inward at least once, an end portion of the conductor bar 200 in an extending direction is in contact with the outer ring 120 of the ground bearing, and the opposite end portion of the conductor bar 200 is fixed to the rear cover 20. The conductor bar 200 may have a predetermined elasticity, and the central portion of the conductor bar 200 is bent radially inward, and thus, have a structure in which the end portion of the shaft side faces radially inward, thereby increasing the pressing force against the outer ring 120. In addition, the structure of the conductor bar 200 is very simple, and there is an advantage in that manufacturing and installation are convenient.

In addition, the end portion of the conductor bar 200 in the extension direction, that is, the end portion of the shaft 11 side may be formed in a straight line. That is, the end portion of the conductor bar 200 in the extension direction may be formed in a flat shape in a straight line parallel to the axial direction, so the contact area between the end portion of the conductor bar and the outer ring of the ground bearing increases, thereby improving the connectivity between the conductor bar and the ground bearing.

Figure 20:
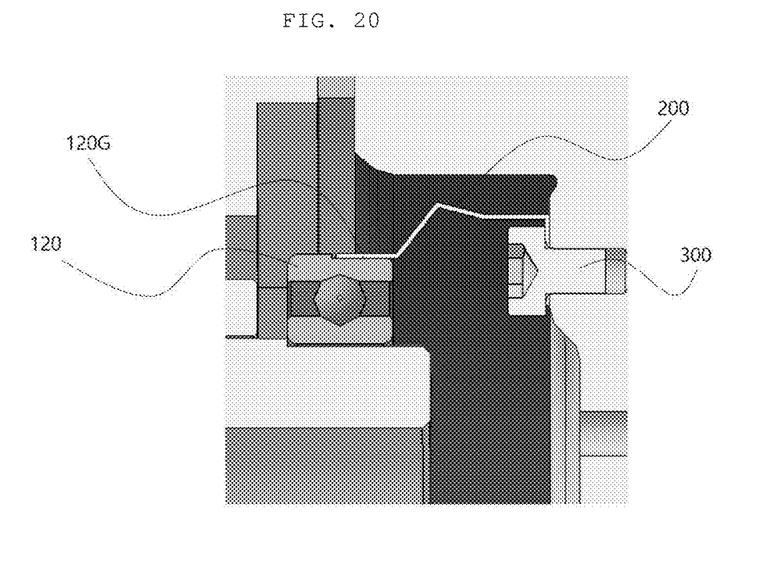
FIG. 20 is an enlarged view of part A of FIG. 18.

FIG. 20 is an enlarged view of area A of FIG. 18 as illustrated, a guide groove 120G recessed inward by a predetermined amount is formed on the outer circumferential surface of the outer ring 120 of the ground bearing, and a portion of the extension 220 of the conductor bar contacting the outer ring 120 of the ground bearing is seated and fixed in the guide groove 120G, thereby preventing the conductor bar 200 from slipping on the outer ring 120. The guide groove 110G may have a structure in which it is recessed by a predetermined amount in the axial direction at a specific position (e.g., a position corresponding to a conductor bar) on the outer circumferential surface of the outer ring 120, or may have a ring groove form in which it is recessed radially by a predetermined amount on the outer circumferential surface of the outer ring 120. In addition, a portion of the extension part 220 of the conductor bar contacting the outer ring 120 is made of a flat straight structure as described above, so the contact area with the outer ring increases, thereby improving the connectivity between the outer ring and the conductor bar.

Furthermore, referring back to FIG. 18 and the like, the ground structure 30 of the present disclosure may include a plurality of conductor bars. In the example of FIG. 18, it is shown that the conductor bars are installed at the upper and lower portions of the shaft in the axial direction, respectively, but three, four or more conductor bars may be installed at a predetermined angle between the conductor bars. In addition, in response to this, the above-described guide groove 110G may also be formed in plurality. By providing a plurality of conductor bars in this way, even if a problem occurs in the connection between any one conductor bar and the bearing, the connection between the bearing and the rear cover may still be maintained by the other conductor bar, so the connectivity between the shaft and the ground bearing may be secured more stably.

The conductor bar described above corresponds to an embodiment for implementing the present disclosure, and although not separately illustrated, the conductor bar is not formed in a rod structure bent radially inward as in the above-described embodiment, but may be formed in a spherical shape with one side opened so as to cover the entire outer ring of the bearing.

Meanwhile, as described above, the ground structure 30 of the present disclosure includes the fixing member 300, and the conductor bar 200 may be fixed to the rear cover 20 by the fixing member 300. In this case, the fixing member 300 may be a bolt. Referring back to FIG. 18 and the like, the conductor bar 200 may be bolted to the rear cover 20. More specifically, as the fixed part 210 corresponding to the end portion of the conductor bar 200 on the rear cover 20 side is bolted to the rear cover 20 by the bolt 300, the conductor bar 200 may be installed and fixed to the rear cover 20. In this way, by the bolting coupling, the conductor bar may be easily and simply fixed to the rear cover, and at the same time, the electrical connection between the conductor bar and the rear cover may be secured, and furthermore, there is an advantage that the conductor bar may be installed on the rear cover of the existing motor as it is without changing the design of the rear cover.

As described above, the inside of the ground bearing 100 may be filled with grease for lubrication between the bearing ball 130 and the inner and outer rings 110 and 120. In this case, the grease may be conductive grease having conductivity, which may improve electrical connectivity between the bearing ball and the inner and outer rings.

Furthermore, as described above, the drive bearing 12 supporting the shaft 11 is installed on the shaft 11. In this case, in the motor 1 of the present disclosure, as the axial current flows through the ground structure 30 to reduce the amount of current flowing to the drive bearing 12 side and reduce the erosion phenomenon on the drive bearing side, even if the bearing ball of the drive bearing is formed of a steel ball, damage to the drive bearing due to the erosion does not occur. That is, the bearing ball of the drive bearing of the motor of the present disclosure may be formed of the steel ball, and thus, may be cheaper than the ceramic ball bearing, thereby reducing the overall manufacturing cost of the motor.

According to the present disclosure, it is possible to prevent a drive bearing from being eroded to reduce, a loss of the drive bearing due to the erosion, reduce vibration and noise generated from a drive bearing due to the erosion phenomenon, and furthermore, reduce manufacturing cost of a motor by applying a steel ball instead of applying a ceramic ball to prevent the erosion in the related art.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An anti-erosion structure of a motor, comprising:
a housing configured to accommodate a stator, a rotor disposed inside the stator, and a shaft disposed inside the rotor;
a rear cover coupled to a rear side of the housing; and
a ground structure configured to ground the shaft,
wherein the ground structure includes a ground bearing installed on the shaft, and a conductor bar having one side fixed to the rear cover and another side contacting the ground bearing,
wherein the conductor bar includes a fixed part fixed to the rear cover and a protrusion extending from the fixed part and protruding toward the shaft,
at least a portion of the protrusion is inserted into a hollow space of the ground bearing to contact an outer circumferential surface of an inner ring of the ground bearing, and
a guide groove recessed inward by a predetermined amount is formed on the outer circumferential surface of the inner ring of the ground bearing so that a portion of the protrusion of the conductor bar contacting the inner ring of the ground bearing is seated.

2. The anti-erosion structure of claim 1, wherein the ground bearing is configured to be inserted into a hollow space of the shaft, and press-fitted into the hollow space of the shaft to have an outer ring of the ground bearing closely adhere to an inner circumferential surface of the shaft, and
wherein the conductor bar is in contact with an inner ring of the ground bearing.

3. The anti-erosion structure of claim 1, wherein the protrusion of the conductor bar is configured to be press-fitted into the hollow space of the ground bearing to press the inner ring of the ground bearing radially outward.

4. The anti-erosion structure of claim 3, wherein the conductor bar is U-shaped, and has a central portion formed in a ring shape to be in contact with the inner ring of the ground bearing, and
end portions of the conductor bar are fixed to the rear cover.

5. The anti-erosion structure of claim 4, wherein, a portion of the protrusion of the conductor bar insertable into the hollow space of the ground bearing is a head part, and a remaining portion of the protrusion is a body part,
the head part has a ring shape, and
the body part is narrowly formed.

6. The anti-erosion structure of claim 3, wherein a spherical structure protrudes from the conductor bar.

7. The anti-erosion structure of claim 6, wherein, a portion of the protrusion of the conductor bar insertable into the hollow space of the ground bearing is a head part, and a remaining portion of the protrusion is a body part,
the head part has a spherical shape, and
the body part is narrowly formed.

8. The anti-erosion structure of claim 1, wherein the conductor bar is bolted to the rear cover.

9. The anti-erosion structure of claim 1, wherein an inside space of the ground bearing is filled with conductive grease.

10. The anti-erosion structure of claim 1, wherein the housing is further configured to accommodate a drive bearing installed on the shaft and support the shaft, and
a bearing ball of the drive bearing is formed of a steel ball.

11. An anti-erosion structure of a motor, comprising:
a housing configured to accommodate a stator, a rotor disposed inside the stator, and a shaft disposed inside the rotor;
a rear cover coupled to a rear side of the housing; and
a ground structure configured to ground the shaft,
wherein the ground structure includes a ground bearing inserted into a hollow space of the shaft, and a conductor bar having one side fixed to the rear cover and another side contacting the ground bearing,
a guide groove recessed inward by a predetermined amount is formed on an outer circumferential surface of an inner ring of the ground bearing so that a portion of the conductor bar contacting the inner ring of the ground bearing is seated.

12. An anti-erosion structure of a motor, comprising:
a housing configured to accommodate a stator, a rotor disposed inside the stator, and a shaft disposed inside the rotor;
a rear cover coupled to a rear side of the housing; and
a ground structure configured to ground the shaft,
wherein the ground structure includes a ground bearing installed outside the shaft, and a conductor bar having one side fixed to the rear cover and another side contacting the ground bearing,
wherein a guide groove recessed inward by a predetermined amount is formed on an outer circumferential surface of an outer ring of the ground bearing so that a portion of the conductor bar contacting the outer ring of the ground bearing is seated.

13. The anti-erosion structure of claim 12, wherein,
the shaft is configured to be press-fitted into the hollow space of the ground bearing so that an inner ring of the ground bearing closely adheres to an outer circumferential surface of the shaft, and
the conductor bar is in contact with the outer ring of the ground bearing.

14. The anti-erosion structure of claim 12, wherein the conductor bar includes a fixed part fixed to the rear cover and an extension part extending from the fixed part toward the shaft, and
an end portion of the extension part extends inward in a radial direction of the outer ring of the ground bearing and is in contact with the outer circumferential surface of the outer ring of the ground bearing.

15. The anti-erosion structure of claim 14, wherein the extension part of the conductor bar presses the outer ring of the ground bearing radially inward.

16. The anti-erosion structure of claim 15, wherein the conductor bar is a rod member,
a central portion of the conductor bar is bent radially inward,
an end portion of a shaft side of the conductor bar is in contact with the outer ring of the ground bearing, and
an end portion of a rear cover side of the conductor bar is fixed to the rear cover.

17. The anti-erosion structure of claim 16, wherein the end portion of the shaft side of the conductor bar is formed straight.

* * * * *